(12) United States Patent
Ploss et al.

(10) Patent No.: US 10,852,171 B2
(45) Date of Patent: Dec. 1, 2020

(54) METHOD AND MEASURING DEVICE FOR DETERMINING MEASUREMENT INFORMATION

(71) Applicant: DIEHL METERING GMBH, Ansbach (DE)

(72) Inventors: Peter Ploss, Bayreuth (DE); Michael Mayle, Ansbach (DE)

(73) Assignee: Diehl Metering GmbH, Ansbach (DE)

( * ) Notice: Subject to any disclaimer, the term of this patent is extended or adjusted under 35 U.S.C. 154(b) by 28 days.

(21) Appl. No.: 16/262,993

(22) Filed: Jan. 31, 2019

(65) Prior Publication Data

US 2019/0323870 A1     Oct. 24, 2019

(30) Foreign Application Priority Data

Apr. 24, 2018 (DE) ........................ 10 2018 003 311

(51) Int. Cl.
    *G01F 1/66*          (2006.01)
(52) U.S. Cl.
    CPC .................................. *G01F 1/667* (2013.01)
(58) Field of Classification Search
None
See application file for complete search history.

(56) References Cited

U.S. PATENT DOCUMENTS 4,735,097 A * 4/1988 Lynnworth .......... G01N 29/343
                                                       73/861.28
4,838,127 A * 6/1989 Herremans .......... B06B 1/0622
                                                       73/642
6,026,693 A      2/2000 Baumoel et al.
(Continued)

FOREIGN PATENT DOCUMENTS

DE            19823165 A1     12/1998
DE      102008029772 A1     12/2009
(Continued)

OTHER PUBLICATIONS

Linder, Gerhard, "Sensors and Actuators Based on Surface Acoustic Waves Propagating Along Solid-Liquid Interfaces", Journal of Physics D: Applied Physics 41 (2008) 123002.

*Primary Examiner* — Harshad R Patel
(74) *Attorney, Agent, or Firm* — Laurence A. Greenberg; Werner H. Stemer; Ralph E. Locher

(57) ABSTRACT

A method for determining measurement information includes conducting waves excited by first oscillation transducers to second oscillation transducers or back to the first transducers and recording to determine measurement data. The measurement information is determined using first and second data or first data determine an excitation parameter of a second wave. The first transducers excite the second wave with polarities reversed relative to a polarity for excitation of a first wave, or subgroups of the first transducers operate differently to excite the first and second waves, and/or first and second subgroups of the first or second transducers are used for recording. Only measurement signals of the first subgroup are used, or measurement signals of first and second subgroups are added to record the first data. Only measurement signals of the second subgroup are used, or measurement signals of subgroups are subtracted, or vice versa, to record second data.

12 Claims, 3 Drawing Sheets

(56) References Cited

U.S. PATENT DOCUMENTS

| | | | | |
|---|---|---|---|---|
| 7,363,174 B2 * | 4/2008 | Kishiro | ................... | G01F 1/663 |
| | | | | 702/54 |
| 2008/0163700 A1 * | 7/2008 | Huang | ................... | G01F 1/663 |
| | | | | 73/861.25 |
| 2010/0095782 A1 * | 4/2010 | Ferencz | ................. | G01F 1/667 |
| | | | | 73/861.28 |
| 2011/0094309 A1 | 4/2011 | Berger et al. | | |
| 2015/0260561 A1 | 9/2015 | Twerdowski et al. | | |
| 2019/0003865 A1 * | 1/2019 | Mayle | ................... | G01N 29/032 |

FOREIGN PATENT DOCUMENTS

| | | | | |
|---|---|---|---|---|
| DE | 102013101950 A1 | 11/2013 | | |
| DE | 102012019217 A1 | 4/2014 | | |
| DE | 102017008776 A1 | 1/2019 | | |
| EP | 0451356 A1 | 10/1991 | | |
| EP | 3421945 | * 6/2018 | ............... | G01F 1/66 |
| WO | 03098166 A1 | 11/2003 | | |

* cited by examiner

METHOD AND MEASURING DEVICE FOR DETERMINING MEASUREMENT INFORMATION

CROSS-REFERENCE TO RELATED APPLICATION

This application claims the priority, under 35 U.S.C. § 119, of German Patent Application DE 10 2018 003 311.3, filed Apr. 24, 2018; the prior application is herewith incorporated by reference in its entirety.

BACKGROUND OF THE INVENTION

Field of the Invention

The invention relates to a method for determining measurement information with a measuring device, in particular with a flow meter, having a measuring tube which receives a fluid and/or through which the fluid flows. The invention furthermore relates to a measuring device.

One possibility for measuring a flow through a measuring tube involves ultrasonic meters. In such meters, at least one ultrasound transducer is used in order to introduce an ultrasound wave into the fluid flowing through the measuring tube, wherein the wave is conducted on a straight path or after multiple reflections at walls or special reflection elements to a second ultrasound transducer. A flow rate through the measuring tube can be determined from the time of flight of the ultrasound wave between the ultrasound transducers, or from a time-of-flight difference in the event of interchanging of the transmitter and receiver.

It is known from an article by G. Lindner, entitled "Sensors and Actuators Based on Surface Acoustic Waves Propagating Along Solid-Liquid Interfaces," J. Phys. D: Appl. Phys. 41 (2008) 123002, to excite conducted waves by using so-called interdigital transducers in which a piezoelectric element is used that has control lines engaging in one another in the manner of a comb, in order to achieve excitation of particular excitation modes of conducted waves. If Lamb waves are excited in a side wall of the measuring tube with such an approach, they in turn excite compression waves in a fluid conveyed in the measuring tube. Conversely, a compression wave conducted through the fluid may in turn excite conducted waves in the side wall, which can be received by a corresponding sensor, for example likewise an interdigital transducer. Through the use thereof, it is possible to carry out an ultrasound-based flow measurement in which the ultrasound transducer ay be disposed outside the measuring tube.

In the case of measurements on fluids, it is often desired to obtain additional information concerning the fluid or the measurement conditions. That additional information may be considered separately, although it is also possible to adapt the parameterization of the measuring device as a function of those quantities, or to take those quantities into account when determining the measurement information, in order to achieve a higher measurement accuracy. For example, a pressure in the measuring tube and a temperature of the fluid and/or of the environment of the measuring device may influence the measurement. At the same time, however, additional sensors which are required in order to record such additional information increase the complexity of the measuring device, which may for example entail higher costs and/or a greater installation space requirement.

SUMMARY OF THE INVENTION

It is accordingly an object of the invention to provide a method and a measuring device, particularly a flow meter, for determining measurement information, which overcome the hereinafore-mentioned disadvantages of the heretofore-known methods and devices of this general type and which determine additional information concerning the ambient conditions of the measuring device or of a conveyed fluid, and/or concerning the influence of the ambient conditions on the measurement, with low technical outlay.

With the foregoing and other objects in view there is provided, in accordance with the invention, a method for determining measurement information with a measuring device, in particular with a flow meter, having a measuring tube which receives a fluid and/or through which the fluid flows, in which first and second waves conducted in the side wall of the measuring tube are excited in chronological succession by first oscillation transducers disposed on a side wall of the measuring tube and are conducted directly in the side wall or indirectly through the fluid to second oscillation transducers disposed on the or a further side wall of the measuring tube or along a propagation path back to the first oscillation transducers, and are recorded there in order to determine first measurement data for the first wave and second measurement data for the second wave, the measurement information being determined as a function of the first and second measurement data or the first measurement data being used in order to determine a parameter of the excitation of the second wave and the measurement information being determined as a function of the second measurement data. On one hand, either all of the first oscillation transducers are operated in order to excite the second wave with polarities reversed relative to the polarity used for the excitation of the first wave or subgroups of the first oscillation transducers are operated differently from one another in order to excite the first and second waves, and/or on the other hand a first and a second subgroup of the first or second oscillation transducers are used for the recording, and in order to record the first measurement data only measurement signals of the first subgroup are taken into account or measurement signals of the first and second subgroups are added together, and in order to record the second measurement data only measurement signals of the second subgroup are taken into account or measurement signals of the first and second subgroups are subtracted from one another, or vice versa.

As will be explained in more depth below, the use of a plurality of oscillation transducers makes it possible to carry out pure-mode excitation of conducted waves, or to record only signals of a particular mode. Due to the explained variation of the excitation and reception conditions between the recordings of the first and second measurement data, as will be explained in more detail below, information concerning the phase and group velocity in the or of the further side wall of the measuring tube and the temperature of the measuring tube are determined. This information may in turn be used in order to improve the measurement operation of the measuring device, or the processing of measurement data in the scope of further measurements. The first and second subgroups may respectively include one or more oscillation transducers. Likewise, the different subgroups, used for excitation of the first and second waves, of the first oscillation transducers may respectively include precisely one oscillation transducer or respectively a plurality of oscillation transducers. For example, precisely one of the first oscillation transducers may be operated in order to excite the first wave, and precisely one other of the oscillation transducers may be operated in order to excite the second wave.

The use of a plurality of oscillation transducers for emitting and receiving the conducted wave is provided, in particular, in order to achieve mode purity of the excitation, and respectively filtering during reception to the relevant mode. If Lamb waves are used as conducted waves, for example, with a given frequency of the excitation, various modes with different wavelengths may be excited. With sufficiently low excitation frequencies, only two oscillation modes can be excited, namely an asymmetrical $A_0$ mode and a symmetrical $S_0$ mode.

Through the use of a corresponding configuration of the excitation regions and a corresponding selection of the excitation frequency, an oscillation mode to be attenuated may be attenuated by destructive interference at least in one propagation direction, or a mode to be amplified may be amplified by constructive interference. With knowledge of the dispersion relation of the side wall or of the further side wall, the excitation frequency for the excitation signal which is used for controlling the oscillation transducer may be selected in such a way that the oscillation mode to be amplified has twice or half the wavelength of the oscillation mode to be attenuated. The spacings of the oscillation transducers, or of their excitation regions, may then be selected in such a way that their spacing corresponds to an odd multiple of the shorter of the two wavelengths. If the oscillation transducers are then operated with the same excitation signal and the same polarity, this results in destructive interference for the longer-wavelength mode and constructive interference for the shorter-wavelength mode. In the case of operating neighboring oscillation transducers with a phase shift of 180° or with reversed polarity, however, the longer-wavelength mode is amplified while the shorter-wavelength mode is attenuated. The same also applies during reception of the conducted wave, that is to say when recording the first and second measurement data. If oscillation transducers having a spacing which corresponds to an odd multiple of the wavelength of the shorter-wavelength mode are used for this purpose, addition of the measurement signals of the oscillation transducers leads to the signals resulting at the various oscillation transducers from the longer-wavelength mode cancelling each other out, so that the contribution of this mode is removed, or filtered out, from the sum of the measurement signals. If the measurement signals of neighboring oscillation transducers with this spacing are subtracted from one another, however, which may for example be possible by connection with the opposite polarity, the contribution of the shorter-wavelength mode is filtered out so that only the contribution of the longer-wavelength mode remains.

The described configuration of the oscillation transducers may be produced by arranging a plurality of oscillation transducers linearly in succession with the aforementioned spacing, particularly in succession in a flow direction of the measuring tube. It is, however, also possible to place the oscillation transducers along curved lines, i.e. for example as concentric circles with the described spacing. Besides the above-explained use of the oscillation transducers for achieving mode selectivity, oscillation transducers with correspondingly selected spacings and excitation frequencies may also be used in order to specify an emission geometry, i.e. for example to emit conducted waves only in one direction, to emit different modes in different directions, or the like. The conduct, proposed according to the invention, of separate measurements in order to determine first and second measurement data, with the polarity of the emitting and receiving oscillation transducers being modified, may furthermore be used in this case.

The oscillation transducers may in this case respectively be configured as piezoelectric oscillation elements. In this case, an element made of a piezoceramic or another piezoelectric material may, in particular, include one electrode on the side facing towards the measuring tube and one electrode on the side facing away from the measuring tube. The electrode on the side facing towards the measuring tube may also protrude from the piezoelectric element or partially enclosed it, in order to allow simpler contacting. The oscillation transducers may be ultrasound transducers.

If a flow rate is intended to be measured with the measuring device or the conducted wave is intended to be conducted along the measuring tube, for example in order to record a deformation of the measuring tube due to the fluid pressure, separate oscillation transducers are typically used in order to emit and receive the conducted wave, with a corresponding measurement often subsequently being repeated with reversed roles. In some cases, however, it may also be expedient to record the emitted conducted wave by using the same oscillation transducer as is used for emitting the conducted wave. For example, the conducted wave may be conducted around the measuring tube one or more times along the propagation path, or reflected after propagation along the measuring tube at a reflection element, so that the conducted wave is conducted back to the same oscillation transducers as were used for emitting this wave. The inventive variation of the operation of the oscillation transducers for emitting the first or second wave and for recording the first and second measurement data may be used in both cases.

A phase velocity and/or a group velocity of the first and/or second wave, particularly in the side wall, and/or a temperature of the measuring tube and/or of the fluid and/or a setpoint frequency of a drive signal which is used in order to operate the first oscillation transducers in the scope of determining fluid information relating to the fluid or the fluid flow, may be determined as measurement information.

In order to determine a phase and/or group velocity, the first and second waves are preferably excited in the same way and recording of the first measurement data is carried out only by using the first subgroup of the first or second oscillation transducers, and recording of the second measurement data is carried out only by using the second subgroup of the first or second oscillation transducers. The first and second subgroups may, as explained, also respectively include only one oscillation transducer. If these subgroups are then spaced differently far apart from the first oscillation transducers, or they lie at different positions of the propagation path on which the conducted wave is conducted back to the first oscillation transducers, the conducted wave passes initially through the first and then through the second subgroup. A phase difference between these measurement data can be determined by comparison of the first and second measurement data. If the relative position of the first and second groups is known, a phase velocity can be determined therefrom. In addition or as an alternative, an envelope of the first and second measurement data may be determined, and a group velocity of the conducted wave may be determined with the aid of the relative shift of the envelopes and the spacing of the groups of the oscillation transducers.

In addition or as an alternative, the above-described length change of the propagation path may also be produced by driving different subgroups of the first oscillation transducers in order to excite the first and second waves. For example, the first wave and the second wave may respectively be excited by precisely one first oscillation transducer, with the oscillation transducers used for the excitation of the first and second waves having, in particular, different distances from the second oscillation transducers, or the different subgroups, which respectively include a plurality of first oscillation transducers, may be separated by different distances from the second oscillation transducers.

The oscillation transmission between the various first oscillation transducers, or between the various second oscillation transducers, is carried out basically only through the side wall itself. This information may therefore be used, for example, in order to correct a flow measurement which depends both on the phase or group velocity of the compression wave in the fluid and on the phase or group velocity of the conducted wave in the side wall or the further side wall.

In addition or as an alternative, the phase or group velocity determined may also be used, for example, to detect an elastic deformation of the measuring tube due to a fluid pressure, and particularly in order to determine the fluid pressure. The explained measurement could in principle also be carried out by exciting only one conducted wave overall and recording the first and second measurement data by using separate recording channels. This, however, would increase the technical outlay for implementation of the measuring device. For example, an additional analog/digital converter or multiplexing would be necessary in order to record the first and/or second measurement data substantially simultaneously. Sequential recording of the first and second measurement data may, however, be implemented very simply since it is merely necessary to switch over which of the subgroups is respectively separated from the data recording.

The already described approach for pure-mode excitation or mode-selective recording of conducted waves is sensitive to changes in the dispersion relation or the measurement geometry, which may for example result from a change in the temperature of the measuring tube. The temperature of the measuring tube depends in turn on the temperature of the fluid and of the environment. The method according to the invention may therefore be used, the one hand, to adapt a setpoint frequency of a drive signal for subsequent operation, in order to improve a mode purity. On the other hand, deviations from the expected measurement values may be evaluated in order, for example by using a look-up table, to determine the temperature of the measuring tube or of the fluid. Various approaches for this will be discussed in detail below.

The measurement information may be determined as a function of a relative phase angle of respective signal profiles recorded as first and second measurement data, or of a time-of-flight difference between the first and second waves, determined with the aid of the envelope of these signal profiles. This may, as explained above, be used in order to determine the phase and/or group velocity of the conducted waves. In order to determine a temperature, or in order to determine a setpoint frequency, however, an alternative approach is preferably used in which the type of excitation is varied instead of the reception position. If all of the first oscillation transducers are operated in order to excite the second wave with a reversed polarity relative to the polarity used for the excitation of the first wave, and if the recording of both measurement data is the same, then in the already explained approach for phase-selective excitation the mode to be attenuated would be fully attenuated in both cases and the mode to be amplified would be received in an inverted form, that is to say with a phase shift of 180°. If the spacing of the first oscillation transducers then changes relative to the wavelength of the modes to be attenuated or to be amplified, this on one hand leads to the oscillation mode to be attenuated not being fully attenuated. On the other hand, the mode to be amplified is superposed with a typically small phase shift, the effect of which is that this mode on one hand has a somewhat lower amplitude in the overall wave, and on the other hand a phase shift relative to optimally in-phase superposition. A phase shift between the first and second measurement data may however be determined with high accuracy, for example by a correlation of the measurement data. Typically, such a phase error is primarily caused by a temperature of the measuring tube, or of the fluid. The temperature may therefore at least approximately be determined from the phase difference which is determined, for example with the aid of a look-up table which, for example, may be filled out by preliminary tests. The same approach could also be used in order to determine an excitation frequency to be used for further measurements.

The setpoint frequency may also be determined by minimizing a deviation of the relative phase angle from a setpoint value, in particular 180°, by varying the frequency of a drive signal which is used in order to operate the first oscillation transducers in order to excite the first and the second wave. As already explained above, optimal excitation geometry and therefore with an expected optimally mode-selective excitation, the phase angle between the first measurement signal and the second measurement signal should be exactly 180°, if the recording is carried out in the same way and the first oscillation transducers for excitation of the second wave are operated with a reversed polarity relative to the polarity used for the excitation of the first wave. The excitation of the first and second waves and the recording of the first and second measurement data may therefore be carried out repeatedly, with the frequency of the drive signal being varied. The frequency of the drive signal may be varied with a predetermined pattern. Preferably, however, the frequency is varied as a function of the deviation of the relative phase angle from the setpoint value. The relative phase angle may therefore finally be regulated by adapting the frequency of the drive signal to a setpoint value, in particular 180°.

In the embodiment variants explained above, the same drive signal and in particular the same frequency is preferably used for the excitation of the first and second waves. Although the excitation may be inverted by reversing the polarity, as explained above, in other regards the first and second waves are however preferably excited in the same way.

As an alternative thereto, it is however possible for the first measurement data to be used in order to determine an excitation frequency of an excitation signal for the first oscillation transducers for excitation of the second wave as the parameter of the excitation. This may, in particular, be used in order to determine, with the aid of the first measurement data, an excitation frequency which allows as great as possible mode selectivity, so that the second measurement data can be recorded with high mode selectivity. This is particularly advantageous when the measurement information, i.e. for example fluid information, is determined only as a function of the second measurement data.

The excitation frequency may in particular be determined by minimizing—by varying the frequency of a drive signal which is used in order to operate the first oscillation transducers in order to excite the first wave—an amplitude of the or a signal profile recorded as first measurement data by using the first or second oscillation transducers. If the measurement signals of the subgroups of the first or second oscillation transducers are superposed in order to record the first measurement data, in such a way that a particular oscillation mode fully destructively interferes, then the amplitude of the signal profile is minimal when the first wave includes almost exclusively this mode, i.e. when maximally pure-mode excitation of this oscillation mode is carried out by the first oscillation transducers.

In principle, the first wave could be excited only once and an expected ideal excitation frequency could be determined directly from the recorded measurement data. To this end, for example, a look-up table could be used. Preferably, frequency-selective consideration could be carried out in this case, so that noise components and other oscillations which have significantly different frequencies are not taken into account. Preferably, however, a plurality of first waves are excited and a plurality of first measurement data are recorded, with the frequency of the drive signal being varied. The variation may be carried out according to a predetermined pattern, although the variation preferably depends on the amplitude of the signal profile. Overall, the amplitude of the signal profile is therefore regulated to a minimum by varying the frequency of the drive signal. In order to record the second measurement data, after this minimum has been found, it is for example possible to change over from addition of the measurement signals of the subgroups to subtraction of the measurement signals, or vice versa, so that the second oscillation transducers, during the recording of the second measurement data, preferably mode-selectively include that oscillation mode which is now optimally excited mode-selectively by the first oscillation transducers.

In the method according to the invention, all of the first oscillation transducers are preferably operated with a common drive signal, with a polarity with which the drive signal is delivered to the respective oscillation transducers being switchable by a switching device for at least some of the first oscillation transducers. This can make it possible to excite various oscillation modes at least approximately mode-selectively.

The first oscillation transducers may respectively include two electrodes, by energizing which, an oscillation of the respective oscillation transducer is initiated, with the electrodes respectively being connectable by the switching device selectively to a first potential, which is in particular determined by the drive signal, and a second potential, which is in particular constant. The effect achieved with little technical outlay by the described procedure is that the polarity of these oscillation transducers can be switched. The constant potential may, in particular, be an earth or ground potential.

In addition, the individual electrodes of the oscillation transducers may also be separable from the two potentials by the switching device. The switching device may also be configured in such a way that the first and second potentials can be short-circuited, and/or that the two electrodes can be short-circuited to one another. The number of first oscillation transducers used for the oscillation excitation may therefore be variable, for example in order to produce different excitation patterns.

The first and second measurement data may be recorded by a recording device by using two measuring terminals, with at least one of the first or second oscillation transducers including two electrodes which can be coupled selectively by using the or a further switching device to the measuring terminals. In particular, one measuring terminal is at earth potential and the second measuring terminal is used for the signal recording, in particular through an analog/digital converter. It is, however, also possible for the recording device to record and convert the difference of the signals at the measuring terminals. In addition, it is possible for at least some of the electrodes to be separable from the two measuring terminals. In this way, for example, with little technical outlay it is possible for only the measurement signals of the first and second subgroup to be taken into account.

With the objects of the invention in view, there is concomitantly provided a measuring device having a measuring tube which receives a fluid and/or through which the fluid flows, first oscillation transducers disposed on a side wall of the measuring tube and a recording device, wherein the recording device is configured to carry out the method according to the invention by driving the first oscillation transducers in order to excite the first and second waves, recording the first and second measurement data by using the first oscillation transducers or second oscillation transducers of the measuring device and determining the measurement information. The measuring device may, in particular, include the first and/or second switching device, as explained above. The recording device may control the switching device and/or the further switching device, particularly in order to switch the connection of the first and/or second oscillation transducers between the recording of the first measurement data and the recording of the second measurement data.

Other features which are considered as characteristic for the invention are set forth in the appended claims.

Although the invention is illustrated and described herein as embodied in a method and a measuring device for determining measurement information, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
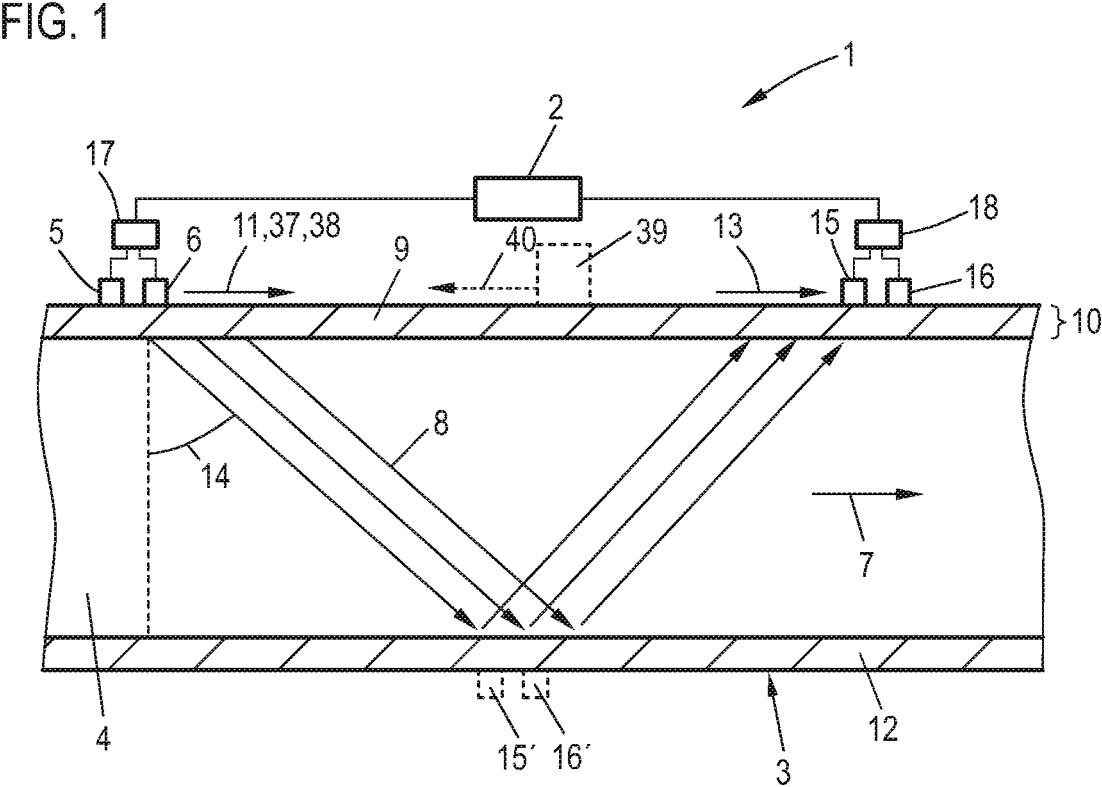
FIGS. 1, 2 and 3 are fragmentary views of an exemplary embodiment of a measuring device according to the invention, by which an exemplary embodiment of the method according to the invention can be carried out.

Referring now to the figures of the drawings in detail and first, particularly, to FIG. 1 thereof, there is seen a measuring device 1 for determining measurement information, namely a flow meter, having a measuring tube 3, in the interior 4 of which fluid can be received or the fluid can flow through its interior 4. Two first oscillation transducers 5, 6 are disposed at a distance from one another on a side wall 9 of the measuring tube 3. The two first oscillation transducers 5, 6 can excite waves conducted in the side wall 9, which are represented schematically by an arrow 11. The excitation frequency in this case is selected in such a way that Lamb waves are excited, so that the face of the side wall 9 facing towards the interior 4 also oscillates and therefore excites compression oscillations in the fluid, which are schematically represented by arrows 8. Lamb waves can be excited when the thickness 10 of the side wall 9 is comparable to the wavelength of the transverse wave in the solid body, which is given by the ratio of the speed of sound of the transverse wave in the solid body and the excitation frequency with which the oscillation transducers 5, 6 oscillate.

The compression waves are reflected at a further side wall 12 and, when they strike the side wall 9 again, excite a conducted wave 13 which is conducted to oscillation transducers 15, 16 and recorded there. If, for example, a fluid velocity of the fluid flowing in the direction of an arrow 7 is intended to be recorded, all compression oscillations should preferably be emitted at the same Rayleigh angle 14. The Rayleigh angle 14 depends on the phase velocity of the conducted wave and on the speed of sound of the fluid. Since, in the case of Lamb waves, with a given frequency, a plurality of oscillation modes are excited, for example with relatively low excitation frequencies, precisely one asymmetrical mode and one symmetrical mode, mode-selective excitation and recording of the conducted waves should be carried out.

This is achieved in the measuring device 1 in that both for emission and for reception of the conducted waves a plurality of oscillation transducers 5, 6 and 15, 16 are respectively used. A recording device 2 controls the oscillation transducers 5, 6 with a common drive signal and records a common output signal of the oscillation transducers 15, 16. Switching devices 17, 18, which can be controlled by the recording device 2, make it possible to specify the way in which the oscillation transducers 5, 6, 15, 16 are connected to the recording device 2, in order for example to separate individual ones of the oscillation transducers 5, 6, 15, 16 from the recording device 2 or connect them with reverse polarity to the recording device 2. This will be explained in detail below with reference to FIGS. 2 and 3. The examples in this case assume that precisely two first oscillation transducers 5, 6 and two second oscillation transducers 15, 16 are used. It would, however, also be possible to use more than two first and second oscillation transducers 5, 6, 15, 16. In this case, however, the first or second oscillation transducers are preferably subdivided respectively into two groups, the members of which are respectively connected in the same way to the recording device 2, or alternatively not. For example, the drive signal may be delivered to the first group and an inverted drive signal may be delivered to the second group, or the first or the second group may be separated from the recording device 2.

Figure 2:
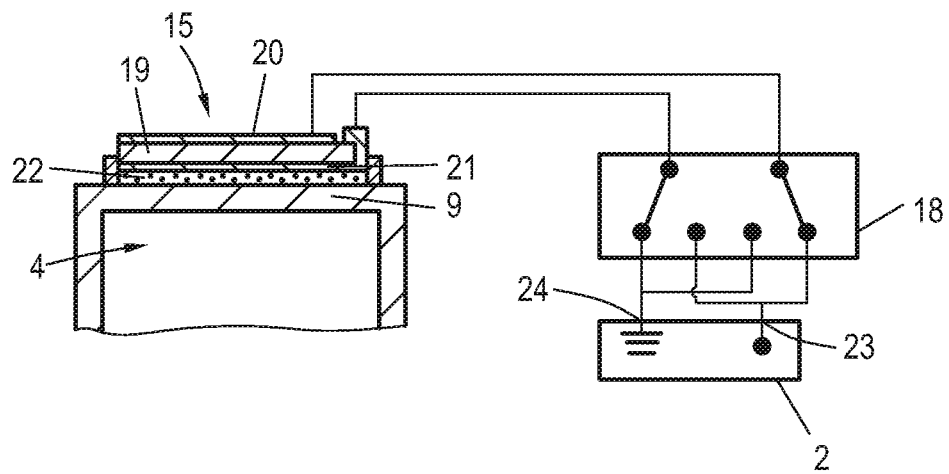
Figure 3:
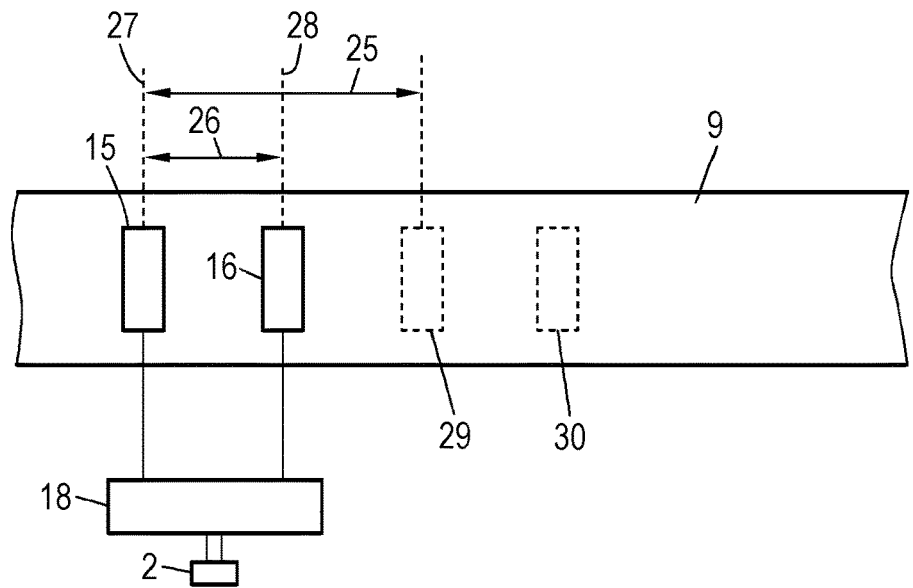

FIGS. 2 and 3 show the connection of the second oscillation transducer 15 to the recording device 2 and the placement of the oscillation transducer 15 on the side wall 9. As represented in FIG. 2 with reference to the example of the oscillation transducer 15, the oscillation transducers 5, 6, 15, 16 are respectively formed of a piezoelectric element 19, on the sides of which facing towards and away from the side wall 9, an electrode 20, 21 is respectively disposed. The electrode 21 in this case encloses the piezoelectric element 19 in order to permit easier contacting of the electrode 21. By applying a voltage between the electrodes 20, 21, the extent of the piezoelectric element 19 perpendicularly to the side wall 9 can be varied, so that oscillations can be coupled into the side wall 9. Conversely, oscillations of the side wall 9 lead to a deformation of the piezoelectric element 19 and therefore to a voltage drop between the electrodes 20, 21.

The oscillation transducer 15 is coupled to the side wall 9 by using a viscous interlayer 22. As an alternative, it could for example be adhesively bonded to the side wall.

The electrodes 20, 21 are connected to two measuring terminals 23, 24 of the recording device 2. The electrode 21 is connected through the measuring terminal 24 to an earth potential and the electrode 20 is fed by the measuring terminal 23 to a measuring circuit, in which in particular analog/digital conversion takes place. By switching over the switching device 18, the connection of the electrodes 20, 21 to the measuring terminals 23, 24 can be modified, so that a polarity with which a measurement signal is delivered to the measuring terminal 23 can be reversed by switching the switching device. As will be explained in more detail below with reference to FIG. 4, for each of the electrodes 20, 21 of the oscillation transducers 15, 16, by using a corresponding circuit of the switching device 18, it is possible to determine which of the measuring terminals 23, 24 it is connected to. If, for example, the electrodes 20, facing away from the side wall, of the two oscillation transducers 15, 16 are connected to the measuring terminal 23 and the electrodes 21, facing towards the side wall, of the two oscillation transducers 15, 16 are connected to the measuring terminal 24, then the voltage drops at the respective electrodes 20, 21 are added constructively when the piezoelectric elements 19 are deformed in-phase, i.e. in particular when the spacing of the oscillation transducers 15, 16 corresponds to an integer multiple of the wavelength of an incoming wave conducted in the side wall 9. If, however, the switching device 18 is switched over in such a way that the measuring terminal 23 is connected to the electrode 20, facing away from the side wall, of the oscillation transducer 15 and the electrode 21, facing towards the side wall, of the oscillation transducer 16, or vice versa, and the measuring terminal 24 is connected to the remaining electrodes, in the case mentioned this would result in destructive interference. When a conducted wave having a wavelength which is an integer factor of the spacing of the oscillation transducers 15, 16 arrives, substantially no measurement signal would therefore be recorded. Instead, a particularly strong measurement signal would be recorded when the distance between the oscillation transducers 15, 16 is an odd multiple of half the wavelength of the incoming conducted wave. This may, as explained with reference to FIG. 3, be used in order to carry out mode-selective recording of conducted waves, it being possible to determine by a circuit of the switching device 18 which mode of the conducted wave is recorded. In this case, only the contacting of the electrodes 20, facing away from the side wall, of the oscillation transducers 15, 16 is represented in FIG. 3 for reasons of clarity.

The excitation frequency with which a conducted wave is excited by the oscillation transducers 5, 6 may be selected in such a way that only precisely two oscillation modes can be excited, the longer-wavelength of these oscillation modes having the wavelength 25. If the oscillation transducers 15, 16 are then, as represented in FIG. 3, disposed in such a way that the distance 26 between their centers 27, 28 corresponds to half of this wavelength 25, then by selecting the polarity with which the oscillation transducers 15, 16 are respectively connected to the recording device 2, i.e. by switching the switching device 18, it is possible to select the oscillation modes for which the measurement signals interfere destructively, so that the recording of these oscillation modes is suppressed. If, for example, the measurement signals of the oscillation transducers 15, 16 are added, by being connected with the same polarity to the recording device 2, this results in destructive interference for the oscillation mode with the wavelength 25. Substantially only the oscillation mode with the shorter wavelength is therefore recorded. In the case of subtraction of the measurement signals by connecting the oscillation transducers 15, 16 with opposite polarities to the recording device 2, the converse applies.

This switchable mode selectivity may be used in order to "tune" an excitation signal. Although it is already possible during construction of the measuring device to ensure that a predetermined excitation frequency and the spacing of the oscillation transducers 5, 6 are matched to one another in such a way that good mode purity is achieved over wide operating ranges, in some operating situations it may nevertheless be advantageous to adapt the excitation frequency as a function of the current operating situation.

In order to make this possible, the oscillation transducers 5, 6 may be connected by using the switching device 17, and connected to the recording device 2, in such a way that, with a particular excitation frequency, a desired oscillation mode, and at least under certain operating conditions also an undesired oscillation mode, are excited. If the oscillation transducers 15, 16 are then coupled by using the switching device 18 to the recording device 2 in such a way that substantially only recording of the undesired oscillation mode mode-selectively takes place, then the excitation frequency may be varied until a minimum of the received amplitude is achieved. As soon as this excitation frequency has been found, the connection of the oscillation transducers 15, 16 by using the switching device 18 may be modified in such a way that the recording device 2 now substantially measures only the signals of the desired oscillation mode. In other words, a first wave 37 is initially excited repeatedly and first measurement data relating thereto are recorded by using the oscillation transducers 15, 16, the oscillation transducers 15, 16 being connected to one another with a certain polarity so that the measurement signals are added or subtracted. The amplitude of a signal profile recorded as first measurement data is subsequently minimized by varying an excitation frequency, in order to find an excitation frequency with which optimal mode purity of the excitation is expected. Subsequently, the polarity of at least one of the oscillation transducers 15, 16 may be modified by switching the switching device 18 so that the measurement signals are now subtracted, if they were previously added, or vice versa, so that the sensitivity of the oscillation transducers 15, 16 for the desired mode is maximized. With this connection, it is then possible to excite a second wave 38 and second measurement data can be recorded, for example in order to record a flow rate or another fluid parameter of a fluid in the measuring tube 3.

The switching device 18 may furthermore be configured in order to fully decouple individual ones of the oscillation transducers 15, 16 fully from the recording device 2, or the measuring terminals 23, 24. Recording of the measurement data may therefore be carried out only by using the oscillation transducer 15 or only by using the oscillation transducer 16. This may be used in order to determine a phase and/or group velocity of the conducted wave in the side wall 9. In order to achieve this, a first conducted wave is initially excited, in particular with mode purity, by the oscillation transducers 5, 6, and only the oscillation transducer 15 is used in order to record first measurement data relating to this wave. Subsequently, the excitation is repeated identically in order to excite a second conducted wave, second measurement data relating to this wave being recorded only by the oscillation transducer 16. By comparison of the phases of the signal profiles formed by the first and second measurement data, a time of flight of the oscillation mode from the oscillation transducer 15 to the oscillation transducer 16 can be determined. The known distance 26 between the oscillation transducers 15, 16 may then be divided by this time in order to determine the phase velocity.

As an alternative thereto, recording of the measurement data may be carried out by using both oscillation transducers of both waves, but the excitation may be carried out only by using the oscillation transducer 15 for the first wave and only by using the oscillation transducer 16 for the second wave. The two approaches may also be combined in order to achieve a greater variation of the length of the propagation path.

Since the first and second waves are excited with a defined pulse shape, the first and second measurement data may furthermore be used in order to determine a group velocity. To this end, an envelope of the signal profiles of the first and second measurement data is initially determined and a time lag of the envelopes is determined by comparison of these envelopes. If the distance 26 is divided by this time lag, the group velocity can be calculated. The phase and group velocities may, for example, be used in order to correct a flow quantity which has been determined. The determination of the flow quantity may, in particular, use a third time of flight during which the oscillation transducers 5, 6 and the oscillation transducers 15, 16 are connected in the same way, so that mode-selective excitation and mode-selective recording take place for the same mode.

The oscillation transducers 5, 6 are connected to control terminals of the recording device 2 in the same way as the oscillation transducers 15, 16 are connected to the measuring terminals 23, 24. In a similar way as the measuring terminal 24, one of the control terminals may also be at an earth potential. The second control terminal is connected to a potential which is determined by the drive signal. In particular, a sinusoidally oscillating potential is applied to the electrodes connected to this terminal while excitation of the conducted wave is intended to take place. By using the switching device 18, it is therefore possible to specify whether the oscillation elements 5, 6 oscillate in-phase or with a phase shift of 180°. This may be used in order to switch over between two modes in which different oscillation modes are selectively excited, as explained above. This may, for example, be used to measure flow rates separately for different propagation parts in the scope of a flow measurement, so that for example information can be obtained concerning a flow profile.

Due to the explained connection of the oscillation transducers 5, 6 to the recording device 2 by using the switching device 17, the polarity of the oscillation of each of the oscillation transducers 5, 6 can simultaneously be reversed. The partial oscillations excited by the individual oscillation transducers 5, 6 are therefore shifted by 180° in phase. If, as explained above, precisely two oscillation modes are excited, one of which is twice the wavelength of the other, and the spacing of the oscillation transducers 5, 6 corresponds to the wavelength of the shorter of these modes, then the conducted wave is selected fully mode-selectively and the signal recorded by using the oscillation transducers 15, 16 is therefore shifted by 180° when switching over the polarity of the oscillation transducers 5, 6. If, however, the dispersion relation in the side wall or the distance between the oscillation transducers 5, 6 then changes, for example because of a temperature change or because of a pressure change in the measuring tube and an elastic deformation of the measuring tube 3 resulting therefrom, then for that oscillation mode, which is substantially superposed constructively, in-phase superposition no longer takes place, but rather the two superposed waves are slightly phase-shifted with respect to one another. This also has the result that, in the case of polarity reversal both of the oscillation transducer 5 and of the oscillation transducer 6, a phase shift of the measurement signal takes place by a phase angle which slightly differs from 180°.

This may, on one hand, be used for "tuning" of the measuring device 1. In this case, the excitation frequency may be varied, for each excitation frequency, a first and a second wave may be successively excited by the oscillation transducers 5, 6 and conducted to the oscillation transducers 15, 16, and recorded there in order to determine first measurement data for the first wave and second measurement data for the second wave. For the excitation of the second wave, the oscillation transducers 5, 6 may be operated with a reversed polarity relative to the polarity used for the excitation of the first wave. As explained above, in the case of perfectly mode-selective excitation a phase shift of exactly 180° is expected in this case. The deviation of the phase shift from 180° may therefore be minimized by varying the excitation frequency, in order to achieve the best possible mode-selective excitation.

In some measurement situations, it may be found by theoretical preliminary considerations or preliminary tests that the observed deviation from a 180° phase shift in the case of reversing the polarity of the operation of the oscillation transducers 5, 6 is substantially dictated by one particular operating parameter of the measuring device 1. For example, the deviation may depend substantially only on the temperature of the measuring tube, and therefore in particular on the temperature of the fluid flowing through the measuring tube, and/or on the ambient temperature. In this case, a look-up table or a mathematical relation between the operating parameter and the extent of the deviation from a 180° phase shift in the case of polarity reversal may be specified, and the operation of the measuring device as explained above may be used in order to determine the operating parameter.

Figure 4:
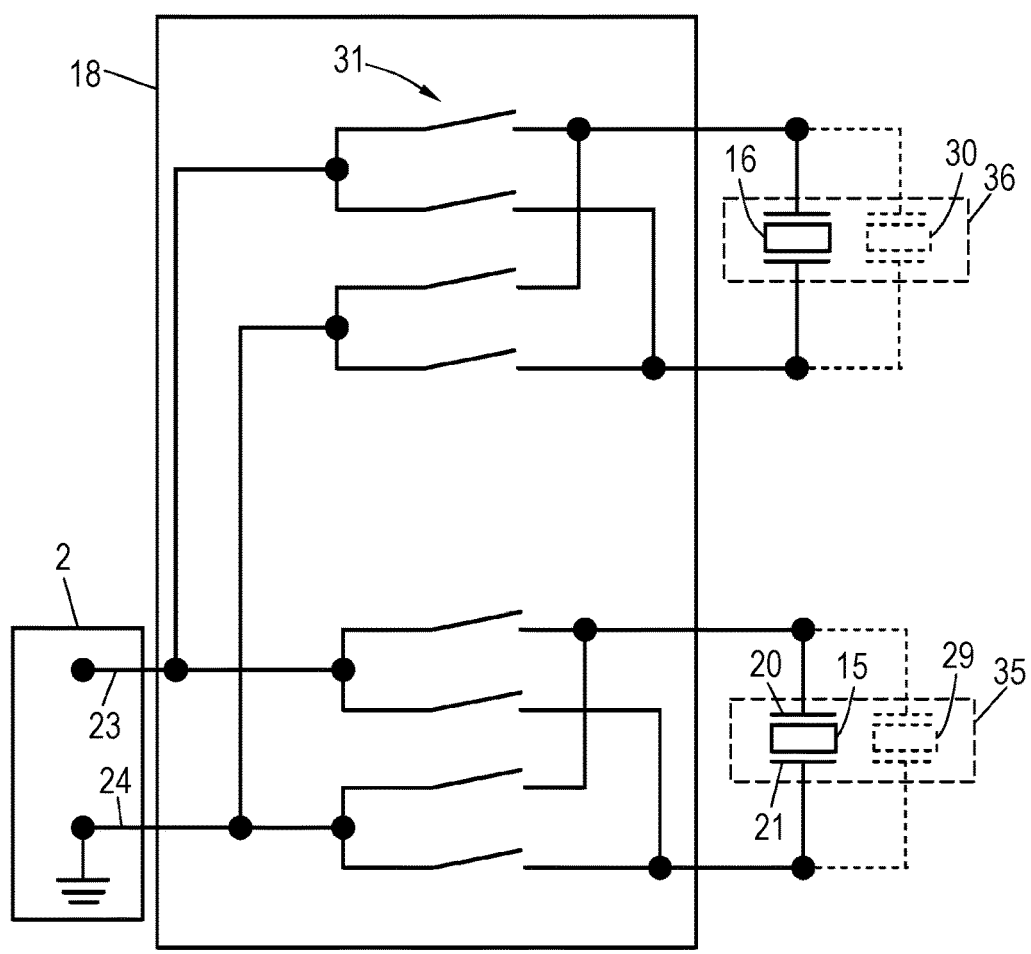
FIG. 4 is a circuit diagram of the connection of the first or second oscillation transducer to the recording device in the exemplary embodiment according to FIGS. 1-3.

This is represented in more detail in FIG. 4 for a better understanding of the function of the switching device 18, or of the identically constructed switching device 17. The switching devices 17, 18 respectively include two terminals, which are connected respectively to the measuring or control terminals 23, 24 of the recording device 2. They furthermore include four terminals which are connected to the individual electrodes 20, 21 of the oscillation transducers 15, 16 and 5, 6, respectively. Each terminal connected to an electrode 20, 21 may be connected selectively by using a switch 31 to one of the terminals of the control device 2. In this way, the individual oscillation transducers 15, 16 and 5, 6, respectively, can be operated with a selective polarity or even fully decoupled from the recording device 2. The switches 31 can be controlled by the recording device 2. With the connection shown, the measuring terminals 23, 24 or control terminals of the recording device 2 may furthermore be short-circuited by corresponding switching of the switches 31. In principle, it would also be possible to adapt the switch configuration in such a way that the electrodes 20, 21 of individual oscillation transducers 5, 6, 15, 16 can be short-circuited without short-circuiting the measuring terminals 23, 24 or the control terminals.

As is represented both in FIG. 3 and in FIG. 4, more than two first and second oscillation transducers may also be used in the measuring device. For example, a further oscillation transducer 29 may be connected in parallel with the oscillation transducer 15 in order to form a jointly driven first subgroup 35 of the oscillation transducers 15, 16, 29, 30, and a further oscillation transducer 30 may be connected in parallel with the oscillation transducer 16 in order to form a jointly controlled second subgroup 36 of the oscillation transducers 15, 16, 29, 30. Preferably, in this case oscillation transducers 15, 29 and 16, 30, having a spacing which corresponds to an integer multiple of the wavelength 25 of the longer of the two wavelengths of the excitable oscillation modes, are respectively connected in parallel.

Figure 5:
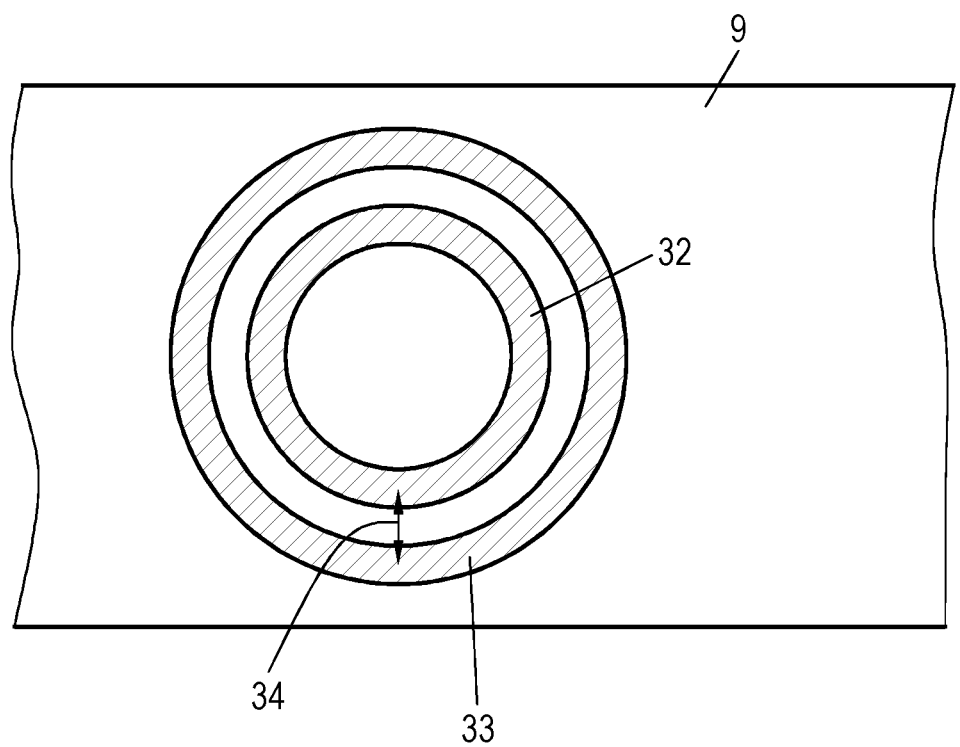
FIG. 5 is a fragmentary view of a further exemplary embodiment of a measuring device according to the invention.

The explanations so far have assumed that the oscillation transducers 5, 6 and the oscillation transducers 15, 16 are respectively disposed linearly in succession. Other configurations of the oscillation transducers are of course also possible. One example of this is represented in FIG. 5. Two oscillation transducers 32, 33 are circular oscillation transducers, which are disposed concentrically. A spacing 34 of the oscillation transducers 32, 33 in this case preferably corresponds, as explained with reference to FIG. 3, to the wavelength of the shorter-wavelength of two excitable oscillation modes. Clearly, many other variants may be envisaged. The individual circles in FIG. 5 could respectively be formed by a plurality of oscillation transducers, which are preferably driven together. Instead of the circular shape, for example, an elliptical shape or the like could be used, or non-concentric circles, ellipses or the like could be used, in order to achieve anisotropic emission of the conducted wave.

Returning to FIG. 1, various modifications of the illustrated embodiment would be possible. One modification would be to use second oscillation transducers 15', 16' disposed on the further side wall 12 of the measuring tube 3 instead of using the second oscillation transducers 15, 16 on the side wall 9. In another modification the use of the second oscillation transducers 15, 15', 16, 16' could be completely avoided, e.g. by using a reflection element 39 that reflects the first and second wave 37, 38 back towards the first oscillation transducers 5, 6 along a propagation path as indicated by the arrow 40.

The following is a summary list of reference numerals and the corresponding structure used in the above description of the invention:

1 measuring device
2 recording device
3 measuring tube
4 interior
5 oscillation transducer
6 oscillation transducer
7 arrow
8 arrow
9 side wall
10 thickness
11 arrow
12 side wall
13 wave
14 Rayleigh angle
15 oscillation transducer
15' oscillation transducer
16 oscillation transducer
16' oscillation transducer
17 switching device
18 switching device
19 piezoelectric element
20 electrode
21 electrode
22 interlayer
23 measuring terminal
24 measuring terminal
25 wavelength 26 spacing
27 center
28 center
29 oscillation transducer
30 oscillation transducer
31 switch
32 oscillation transducer
33 oscillation transducer
34 spacing
35 subgroup
36 subgroup
37 first wave
38 second wave
39 reflection element
40 arrow

The invention claimed is:

1. A method for determining measurement information with a measuring device or a flow meter having a measuring tube for at least one of receiving a fluid or conducting a fluid flow through the measuring tube, the method comprising the following steps:
exciting first and second waves conducted in a side wall of the measuring tube in chronological succession by using first oscillation transducers disposed on the side wall of the measuring tube and conducting the first and second waves directly in the side wall or indirectly through the fluid to second oscillation transducers disposed on the side wall or on a further side wall of the measuring tube or along a propagation path back to the first oscillation transducers, and recording the first and second waves there to determine first measurement data for the first wave and second measurement data for the second wave; and
in a first alternative determining the measurement information as a function of the first and second measurement data or in a second alternative using the first measurement data to determine a parameter of the excitation of the second wave and determining the measurement information as a function of the second measurement data; and
in both alternatives:
using a first and a second subgroup, the respective subgroup including one or more of the first or second oscillation transducers for the recording, recording the first measurement data by adding measurement signals of the first and second subgroups together, and recording the second measurement data by subtracting measurement signals of the first and second subgroups from one another, or vice versa.

2. The method according to claim 1, which further comprises determining the measurement information as at least one of:
a phase velocity or a group velocity of at least one of the first or second wave in or out of the side wall, or
a temperature of at least one of the measuring tube or the fluid, or
a setpoint frequency of a drive signal used to operate the first oscillation transducers when determining fluid information relating to the fluid or the fluid flow.

3. The method according to claim 2, which further comprises determining the setpoint frequency by minimizing a deviation of a relative phase angle from a setpoint value or 180° by varying a frequency of a drive signal used to operate the first oscillation transducers to excite the first and the second wave.

4. The method according to claim 1, which further comprises determining the measurement information either as a function of a relative phase angle of respective signal profiles recorded as first and second measurement data, or as a function of a time-of-flight difference between the first and second waves, the time-of-flight difference being determined using envelopes of the signal profiles.

5. The method according to claim 1, which further comprises using the first measurement data to determine an excitation frequency of an excitation signal for the first oscillation transducers to excite the second wave as the parameter of the excitation.

6. The method according to claim 5, which further comprises determining the excitation frequency by minimizing an amplitude of the signal profile recorded as first measurement data by the first or second oscillation transducers by varying a frequency of a drive signal used to operate the first oscillation transducers to excite the first wave.

7. The method according to claim 1, which further comprises operating all of the first oscillation transducers with a common drive signal, and using a switching device to switch a polarity with which the drive signal is delivered to the respective oscillation transducers for at least some of the first oscillation transducers.

8. The method according to claim 7, which further comprises providing each of the first oscillation transducers with two respective electrodes being energized to initiate an oscillation of the respective oscillation transducer, and using the switching device to selectively connect the electrodes to a first potential and a second potential.

9. The method according to claim 8, which further comprises using the drive signal to determine the first potential, and the second potential being constant.

10. The method according to claim 1, which further comprises using two measuring terminals of a recording device to record the first and second measurement data, and providing at least one of the first or second oscillation transducers with two electrodes to be selectively coupled to the measuring terminals by the switching device.

11. The method according to claim 1, which further comprises operating all of the first oscillation transducers to excite the second wave with polarities reversed relative to a polarity used for the excitation of the first wave or operating mutually different subgroups of the first oscillation transducers, each subgroup including precisely one or a plurality of the first oscillation transducers, to excite the first and second waves.

12. A measuring device, comprising:
a measuring tube at least one of receiving a fluid or conducting a fluid flow through said measuring tube;
first oscillation transducers disposed on a side wall of said measuring tube; and
a recording device configured to carry out a method for determining measurement information, the method including the following steps:
driving said first oscillation transducers to excite first and second waves conducted in the side wall of the measuring tube in chronological succession, the first and second waves being conducted directly in the side wall or indirectly through the fluid to second oscillation transducers of the measuring device disposed on the side wall or on a further side wall of the measuring tube or along a propagation path back to the first oscillation transducers;
using the first oscillation transducers or the second oscillation transducers to record first measurement data for the first wave and second measurement data for the second wave and determining the measurement information;

in a first alternative determining the measurement information as a function of the first and second measurement data or in a second alternative using the first measurement data to determine a parameter of the excitation of the second wave and determining the measurement information as a function of the second measurement data; and in both alternatives:
   using a first and a second subgroup, the respective subgroup including one or more of the first or second oscillation transducers, for the recording, recording the first measurement data by adding measurement signals of the first and second subgroups together, and recording the second measurement data by subtracting measurement signals of the first and second subgroups from one another, or vice versa.

* * * * *